April 9, 1929. J. H. HAMMOND, JR Re. 17,262

SYSTEM FOR THE TRANSMISSION OF RADIANT ENERGY

Original Filed July 27, 1917 2 Sheets-Sheet 1

INVENTOR
JOHN HAYS HAMMOND, JR.
BY Ira J. Williams
ATTORNEY

April 9, 1929. J. H. HAMMOND, JR Re. 17,262

SYSTEM FOR THE TRANSMISSION OF RADIANT ENERGY

Original Filed July 27, 1917 2 Sheets-Sheet 2

JOHN HAYS HAMMOND JR.
INVENTOR
BY
ATTORNEY

Reissued Apr. 9, 1929. Re. 17,262

UNITED STATES PATENT OFFICE.

JOHN HAYS HAMMOND, JR., OF GLOUCESTER, MASSACHUSETTS.

SYSTEM FOR THE TRANSMISSION OF RADIANT ENERGY.

Original No. 1,443,361, dated January 30, 1923, Serial No. 183,117, filed July 27, 1917. Renewed June 12, 1922, Serial No. 567,814. Application for reissue filed January 21, 1925. Serial No. 3,885.

Some of the objects of this invention are to provide an improved system and an improved method for the transmission of radiant energy, whereby a high degree of secrecy may be maintained; and to provide other improvements as will appear hereinafter.

Figure 1:
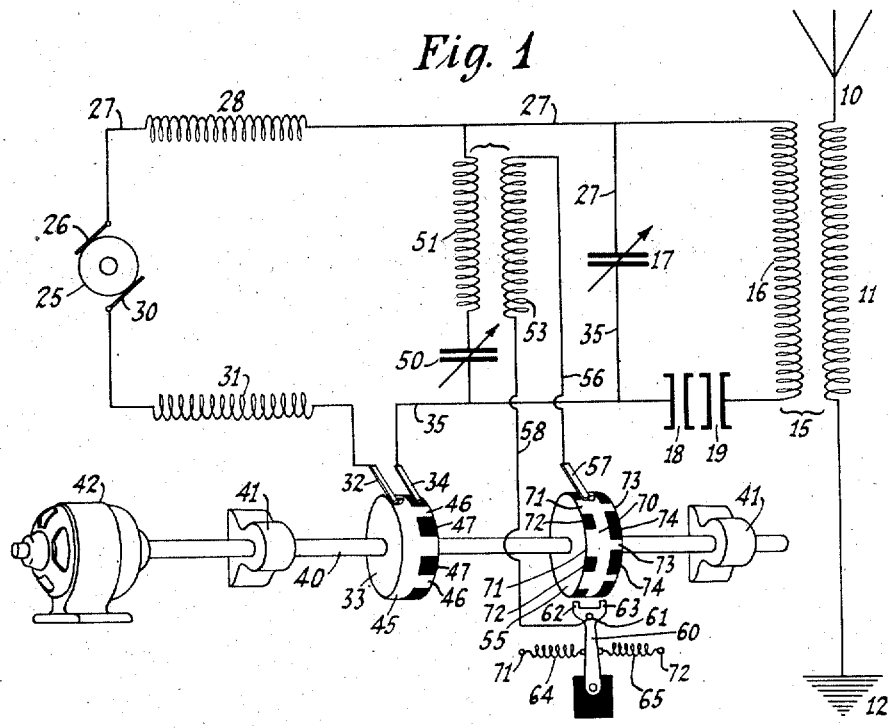
Figure 2:
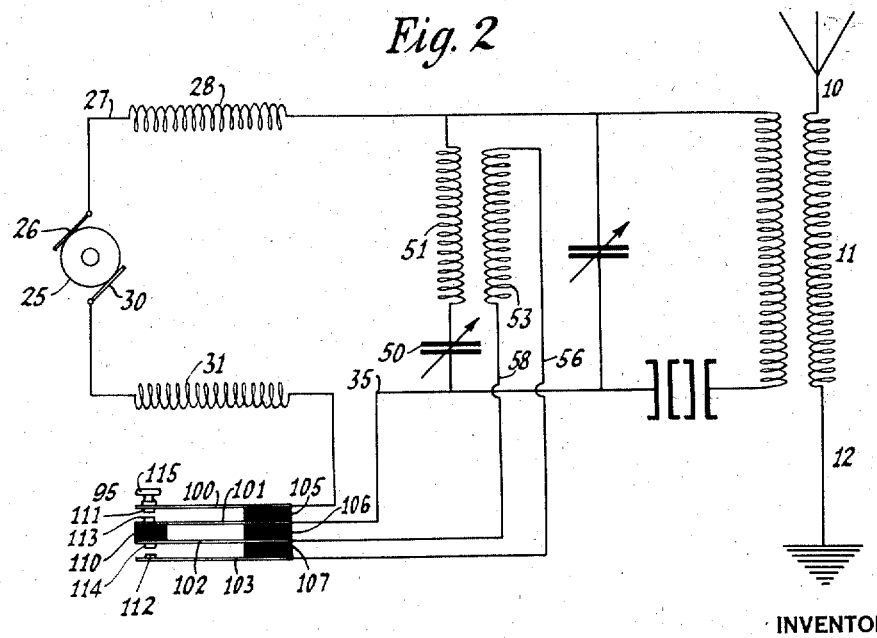

In the accompanying drawings, Figure 1 is a diagrammatic view of a transmission system constructed in accordance with this invention; Fig. 2 a diagrammatic view of a modified transmisison system constructed in accordance with this invention; and Fig. 3 a diagrammatic view of a further modified transmission system constructed in accordance with this invention.

Referring to the drawings, and particularly to Fig. 1, one embodiment of this invention comprises an open aerial circuit including an antenna 10 having in series therewith a coil 11, and which is grounded in any suitable manner as at 12. The coil 11 forms the secondary of an ordinary oscillation transformer 15, having a primary coil 16 which is arranged in a closed oscillatory circuit including a variable condenser 17 and one or more spark gap devices 18, 19.

For energizing the closed circuit 16, 17, 18, 19, and the open aerial circuit 10, 11, 12 controlled thereby, a high voltage direct current electric generator 25 or other source of high voltage direct current is provided, and one pole or brush 26 of this generator is connected by a conductor 27 to one side of the variable condenser 17, a choke coil 28 being included in this conductor 27 for a well known purpose. The other brush or pole 30 of the generator 25 is connected through a choke coil 31 to a brush 32, which is arranged to co-operate with a primary commutator 33 which is provided with a second brush 34 which is connected by a conductor 35 to the other side of a variable condenser 17.

The commutator 33 is provided to interrupt in a predetermined manner, the current from the generator 25, and is rigidly secured to a shaft 40 which is mounted in any suitable stationary bearings 41, and which is arranged to be rotated at a predetermined rate by an electric motor 42 or by any other suitable means. The commutator 33 is cylindrical in form, and one end of its cylindrical surface is formed by a continuous conducting ring or slip ring 45, while the other end of its cylindrical surface is formed by a plurality of equi-spaced equal rectangular conducting segments 46, and by a plurality of equal rectangular nonconducting segments 47 which fill the spaces between the conducting segments 46. The conducting segments 46 are preferably of substantially the same width as the nonconducting segments 47 and are either integral with the continuous conducting ring 45, as shown, or electrically connected thereto by any suitable means. The continuous ring 45 is arranged to engage slidably against the brush 32, while the conducting and nonconducting segments 46 and 47 are arranged to engage slidably against the corresponding brush 34, as the commutator is rotated.

For impressing upon the high frequency oscillations transmitted by the open aerial circuit 10, 11, regular oscillations or variations having a lower or secondary frequency, a tone circuit including a variable condenser 50 and a coil or inductance 51 is connected between the conductors 27 and 35 and in parallel with the variable condenser 17 of the closed oscillatory circuit 16, 17, 18, and 19. The coil 51 of the tone circuit is inductively connected to a secondary coil 53 which is in a normally open circuit controlled by a secondary commutator 55, which is mounted upon and rigidly secured to the shaft 40, one end of the secondary coil 53 being connected by a conductor 56 to a brush 57 which is normally in engagement with the secondary commutator 55, and the other end of the secondary coil 53 being connected by a conductor 58 to a key 60 which is arranged to be oscillated about a fixed pivot 61 and which carries two brushes 62 and 63 which are normally held out of engagement with the commutator 55 by means of two opposed springs 64 and 65 which are connected at their inner ends to the key 60 and at their outer ends to two fixed pins 71 and 72 respectively.

The secondary commutator 55 is cylindrical in form and the central portion of its cylindrical surface is formed by a continuous conducting ring 70. Upon the left hand side of the conducting ring 70 are a plurality of equal rectangular conducting segments 71 which are equi-spaced around the commutator and are the same widths as, and arranged in alinement with the conducting segments 46 of the primary commutator 33. The spaces between the conducting segments 71 of the secondary commutator are filled by nonconducting segments 72 which are the same in width as the nonconducting segments 47 of the primary commutator 33.

Upon the right-hand side of the conducting ring 70 are a plurality of comparatively narrow oblong rectangular conducting segments 73 which are equi-spaced around the commutator and which are arranged so that their longitudinal axes coincide substantially with the longitudinal axes of the conducting segments 71 upon the left-hand side of the ring 70. These comparatively narrow segments 73 are preferably from one-third to one-half the width of the conducting segments 71 upon the opposite side of the ring. The spaces between the comparatively narrow segments 73 are filled by non-conducting segments 74. All of the segments 71 and 73 of the secondary commutator 55 may be either integral with the central ring 70, as shown, or may be electrically connected to the central ring 70 by any suitable means.

In the operation of the system shown in Fig. 1 the generator 25 is continuously rotated at a predetermined rate to produce the desired high potential, and the motor 42 is rotated at a constant rate to produce the desired rate of rotation of the commutators 33 and 55. The action of the primary commutator 33 upon its brushes 32 and 34 causes the main supply of current from the generator 25 to be interrupted at a predetermined rate, and the key 60 normally in a central position and its brushes 62 and 63 normally out of engagement with the secondary commutator 55, the periodically interrupted current from the generator 25 will act upon the closed oscillatory circuit 16, 17, 18 and 19 to cause the open aerial circuit 10, 11 and 12 to transmit a series of high frequency electroradiant oscillations which are interrupted periodically as a result of the action of the primary commutator 33, thus normally forming a series of groups, or "dashes" of electroradiant oscillations. These groups or "dashes" are each made up of a plurality of continuous oscillations having a high wave or oscillation frequency determined by the constants of the antenna or open aerial circuit 10, 11 and 12, and a secondary frequency impressed upon the high frequency and determined by the tone circuit 50, 51. While the system is thus in normal operation, a movement by the operator of the outer end of the key 60 towards the left will throw the brush 62 in engagement with the secondary commutator 55 to be slidably engaged alternately by the conducting and non-conducting segments 71 and 72 upon the left of the ring 70. This will intermittently or periodically close the circuit through the secondary coil 53 and will cause the open aerial circuit 10, 11 and 12 to continue to transmit a series of groups or "dashes" of electroradiant oscillations having the same normal group frequency determined by the construction and rate of rotation of the primary commutator 33 and having the same high oscillation or wave frequency determined by the constants of the open aerial circuit 10, 11 and 12 but having a modified secondary frequency caused by the variation of the effective inductance of the coil 51 of the tone circuit 50, 51, by the inductive reaction of the secondary coil 53 upon the coil 51 of the tone circuit while the circuit through the secondary coil 53 is thus periodically or intermittently closed. Brush orientation is adjusted so that the conducting segments 46 of the primary commutator and the conducting segments 71 of the secondary commutator 55 will be rotated simultaneously into engagement and simultaneously out of engagement successively with their corresponding brushes 34 and 62. Owing to the fact that the commutators 33 and 55 are thus synchronized with respect to the brushes 34 and 62, the modified secondary wave frequency of the groups of waves will continue through the entire period of each group. A movement now of the outer end of the key 60 towards the right will draw the brush 62 from the secondary commutator 55 and will cause the brush 63 to be moved into engagement with the secondary commutator in such a position as to be engaged successively by the conducting and nonconducting segments 73 and 74 on the ring 70 and thus periodically or intermittently close the circuit through the secondary coil 53, but in this case the period in which the circuit through the secondary coil 53 is closed will be only from one-third to one-half the duration of each group of waves transmitted by the open aerial circuit 10, 11 and 12, depending upon the widths of the conducting segments 63, and consequently the modified secondary frequency of the groups of waves transmitted will be impressed upon the groups of waves only in the form of a "dot" in each group of waves.

It is therefore evident that by swinging the outer end of the key 60 either to the right or to the left as may be necessary a series of "dots" and "dashes" of the modified secondary frequency may be imposed in any desired sequence upon the groups of waves normally transmitted by the open radial circuit 10, 11 and 12.

The transmitting system shown in Fig. 1 and just described is designed to be operated in connection with a selective receiving system of any well known or suitable construction having an open aerial circuit tuned to the high frequency of the open aerial circuit 10, 11 and 12 of the transmitting station, and having a closed oscillatory circuit controlled by the open aerial circuit and tuned to the modified secondary wave frequency of the transmitting station which is produced as a result of the closing of the circuit through the secondary coil 53 by moving the key 60 either to the left or to the right to form either a "dash" or a "dot" respectively, as may be desired.

In the form of this invention shown in Fig. 2 the construction is the same as that shown in Fig. 1 except that instead of interrupting the circuits from the generator 25 and through the secondary coil 53 automatically and regularly by two commutators 33 and 55 and their co-operating parts, these circuits are arranged to be opened and closed at the will of an operator by means of a multiple contact switch 95 comprising four flexible, resilient, normally parallel conducting switch members 100, 101, 102 and 103 which are spaced apart by and rigidly secured to three fixed insulating blocks 105, 106 and 107. The switch members project freely in the same direction from the blocks 105, 106, 107, and the free ends of the two intermediate switch members 101, 102 are spaced apart and insulated by a block 110 to which the free ends of these intermediate members 101, 102 are rigidly secured. The two outer switch members 103 and 100 are provided adjacent their free ends with inwardly projecting oppositely disposed contacts 111 and 112, and the intermediate switch members 101, 102 are provided with outwardly projecting contacts 113 and 114 arranged to be engaged by the outer contacts 111 and 112 respectively, all of these contacts being integral or otherwise electrically connected to the corresponding switch members. The outer or upper switch member 100 is provided at its free end with a key 115 whereby the switch may be operated. These four switch members 100, 101, 102, 103 are connected respectively to the heretofore described coil 31, conductor 35, conductor 58 and conductor 56.

In the operation of the system shown in Fig. 2 and just described, when the key 115 is depressed it first moves the contact 111 into engagement with the contact 113, thus closing the circuit through the generator 25 and causing the open aerial circuit 10, 11 and 12 to radiate a series of electroradiant oscillations having a high wave frequency determined by the open aerial circuit 10, 11 and 12 and a secondary wave frequency imposed upon the high frequency waves and determined by the tone circuit 50 and 51. As the key 115 is further depressed it moves the contact 114 against the contact 112 and closes the circuit through the secondary coil 53 and thus, by the reaction of the secondary coil 53 upon the primary coil 51 of the tone circuit 50, 51, modifies the period of oscillation of the tone circuit 50, 51, and consequently the secondary frequency of the waves radiated from the open aerial circuit 10, 11 and 12.

The transmission system shown in Fig. 2 is intended to be operated in connection with my well known or suitable receiving system, such for instance as has been described hereinbefore in connection with Fig. 1. The transmitting operator sends the character which he wishes to be received by manipulating the key 115 through the last part of its stroke, and upon the completion of the character he releases the key. A series of high frequency waves would thus be radiated throughout the duration of the character, or series of characters, if desired, and would register simply as a "dash" at any receiving station making use of high frequency tuning alone.

Figure 3:
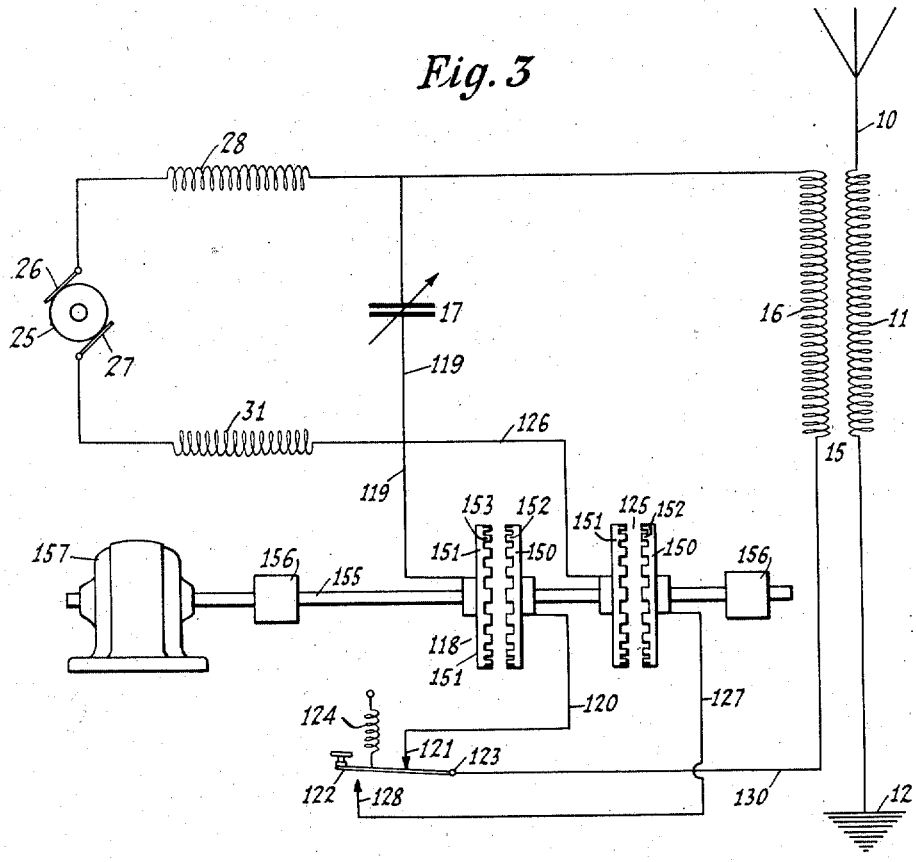

In the form of this invention shown in Fig. 3 the system is somewhat similar to the system shown in Fig. 2 but instead of utilizing a tone circuit for producing a secondary frequency and an inductance for varying the secondary frequency, the modified system in Fig. 3 utilizes a pair of rotary spark gap devices for similar purposes. The modified system shown in Fig. 3 comprises an open aerial circuit including an antenna 10 which has in series therewith a coil 11 and which is grounded through the coil as at 12. The coil 11 forms the secondary of a transformer 15 having a primary coil 16 which is arranged in a normally closed oscillatory circuit including a variable condenser 17 and a primary rotary spark gap device 118.

One side of the spark gap device 118 is connected by a conductor 119 to one side of the variable condenser 17, and the other side of the spark device 118 is connected by a conductor 120 to a stationary contact 121 which is arranged to be engaged by a key 122 which is arranged to swing about a fixed pivot 123 and which is normally held in engagement with the contact 121 by means of a spring 124. A secondary spark gap device 125 is connected on one side by a conductor 126 to the conductor 119 which leads to the variable condenser 17, and is connected upon the other side by a conductor 127 to a stationary contact 128 which is arranged in the path of but normally out of engagement with the key 122. The key 122 is connected by a conductor 130 to one end of the coil 16. Energy is supplied to the system by a direct current high potential generator 25 which is connected through two choke coils 28 and 31, to the opposite sides of the variable condenser 17, as hereinbefore described.

Each of the spark gap devices 118 and 125 may be of any well known or suitable construction, for instance, each of these devices may consist of a stationary segmented disk 150 and a rotary segmented disk 151, each stationary disk 150 being provided with a predetermined number of equi-spaced radial teeth or segments 152 spaced from and facing an equal number of equi-spaced radial teeth or segments 153 provided upon the corresponding rotary disk 151. The two rotary disks 151 may be rigidly secured upon but insulated from a shaft 155 arranged to rotate in stationary bearings 156 and to be rotated at a predetermined and uniform rate by an electric motor 157 or other suitable means. The two stationary disks 150 loosely surround and are insulated from the shaft 155 in any suitable manner. The distance between the two disks 150 and 151 of each spark gap device is so adjusted that as each disk 150 is rotated the corresponding spark gap device will be allowed to discharge each time that the teeth 153 of its rotary disk 151 pass through positions opposite the teeth 152 upon the corresponding stationary disk 150. The number of times per second which either spark gap device 118 or 125 may discharge is determined by the number of teeth 152 upon and by the rate of rotation of the corresponding rotary disk 151.

The two spark gap devices 118 and 125 are constructed and operated so as to discharge at slightly but definitely different rates, for instance, 20,000 and 21,000 times per second respectively. This might be accomplished, for instance by providing each disk 150 and 151 of one spark gap device 118 with a hundred teeth 152 or 153, and each disk 150, 151 of the other spark gap device 125 with one hundred and five teeth 52 or 53 and then rotating the shaft 55 at a constant rate of 200 revolutions per second. The same result might be accomplished by duplicate spark gap devices mounted upon different shafts suitably geared together.

In the operation of the form of this invention shown in Fig. 3, the generator 25 is rotated at a predetermined and constant rate to furnish the desired high potential of direct current and to energize the system. The key 122 is normally held in engagement with the contact 121 by the spring 124 and maintains a normally closed oscillatory circuit through the primary spark gap device 118, the variable condenser 17 and the primary coil 16. The motor 157 is driven at a constant predetermined rate as hereinbefore described. The variable condenser 17 will now discharge through the primary spark gap device 118 at a predetermined rate, for instance 20,000 times per second, and the impulses of current thus produced through the primary coil 16 will cause the open aerial circuit 10, 11 and 12 to radiate a series of waves having a high frequency of oscillation which is the natural frequency of oscillation of the open aerial circuit 10, 11 and 12 and having impressed thereon a secondary frequency determined by the primary rotary spark gap device 118 which is now in series with the coil 16. When the key 122 is depressed, the circuit through the primary spark gap device 118 will be broken and the circuit will be closed through the secondary spark gap device 125 and the coil 16, thus causing the variable condenser 17 to be discharged through the secondary spark gap device 125 at a rate, for instance, of 21,000 times per second. The impulses of current thus produced through the coil 16 will cause the open aerial circuit 10, 11 and 12 to radiate waves of the same frequency as before, but having modified secondary frequency impressed thereon as determined by the secondary spark gap device 125.

The transmission system shown in Fig. 3 is intended to be used in connection with any well known or suitable receiving system having a receiving element tuned to the high frequency of the transmission system, and a receiving element controlled by the high frequency element and tuned to respond to the modified secondary frequency of the transmission system.

It is evident from the foregoing that this invention provides a system whereby radiant energy may be transmitted with great secrecy. In each of the foregoing transmission systems a series of oscillations is radiated having a predetermined high frequency and having impressed thereon a predetermined secondary frequency, and the signals or characters are effected by slightly varying from time to time at the will of the operator for varying periods the secondary frequency. In the system shown in Fig. 1 the primary commutator 33 is provided merely for the purpose of interrupting the high frequency electroradiant waves in such a manner as to add to the confusion of any outside operator who attempts to "listen in" and it is obvious that the primary commutator 33 might be omitted together with its function, and in such a case the conductor 35 would be connected directly to the right-hand end of the choke-coil 31. In each of the heretofore described systems the construction is preferably such that both the secondary frequency which is ordinarily or normally transmitted, and the modified secondary frequency which is transmitted periodically at the will of the operator to effect the signals or characters, are preferably above audibility so as to add to the difficulty of "listening in" by an outside operator, and to render such "listening in" practically impossible.

Having fully described my invention, what I claim is:

1. In a system for the transmission of intelligence, a transmitter comprising a source of energy having the form of high frequency electrical oscillations, means for impressing periodic amplitude variations of relatively different frequency upon said electrical oscillations, a second means for altering the frequency of said first mentioned means and a single switch for rendering said second mentioned means active.

2. In a system for the transmission of intelligence, a transmitter comprising a source of energy having the form of high frequency electrical oscillations, means for impressing periodic amplitude variations of relatively different frequency upon said electrical oscillations, a second means for altering the frequency of said first mentioned means and a single manually operable switch for rendering said second mentioned means active.

3. In a system for the transmission of intelligence, a transmitter comprising a source of energy having the form of high frequency electrical oscillations, means for impressing periodic amplitude variations of relatively different frequency upon said electrical oscillations, a second means for altering the frequency of said first mentioned means and means for controlling the variations without changing the frequency of the oscillations comprising a single switch for rendering said second mentioned means active to transmit a signal, with substantially constant frequency of oscillations.

4. In a system for the transmission of intelligence, a transmitter comprising a source of energy having the form of high frequency electrical oscillations, means for impressing periodic amplitude variations upon said oscillations, said variations having a frequency differing from the first-mentioned frequency, a second means for altering the frequency of said first mentioned means, and a key for selectively rendering said second mentioned means effective.

5. In a system for the transmission of intelligence, a transmitter comprising a source of energy having the form of high frequency electrical oscillations, means for impressing periodic amplitude variations of a plurality of relatively different frequencies upon the electrical oscillations, automatic signal-controlling means connected with said impressing means and a manually controlled member for varying the frequency of said impressing means.

6. In a system for the transmission of intelligence, a transmitter comprising a source of energy having the form of high frequency electrical oscillations, means for impressing periodic amplitude variations on said electrical oscillations, means for modifying the frequency of said periodic amplitude variations, automatic signal-controlling means connected with said modifying means and a manually operated member for rendering the signal-controlling means operative.

7. In a system for the transmission of intelligence, a transmitter comprising a source of energy having the form of high frequency electrical oscillations, means for impressing periodic amplitude variations on said electrical oscillations, means for modifying the frequency of said periodic amplitude variations, a commutator connected with said modifying means and provided with a plurality of contact paths having different characteristics, and a manually controlled member arranged for engagement with one of the contact paths of the commutator to send signals of one character and movable into engagement with another of said contact paths to send signals of a different character.

8. In a system for the transmission of intelligence, a transmitter comprising a source of energy having the form of high frequency electrical oscillations, means for impressing periodic amplitude variations on said electrical oscillations, means for modifying the frequency of said periodic amplitude variations to send signals, a commutator connected with said modifying means and provided with two contact paths having contacts of larger and smaller dimensions respectively, and a manually controlled member arranged for engagement with the contacts of larger dimensions to send dashes and movable into engagement with the other contact path to send dots.

9. In a system for the transmission of intelligence, means for producing high frequency electrical oscillations, means for radiating groups of waves, each group consisting of waves having a wave frequency corresponding to the frequency of said electrical oscillations and a secondary frequency impressed upon the wave frequency, and means for modifying the secondary frequency in accordance with signals.

10. In a system for the transmission of intelligence, a transmitter comprising a source of energy having the form of high frequency electrical oscillations. and means for impressing periodic amplitude variations of respectively different frequencies upon the electrical oscillations, said means comprising a tuned circuit including an induction coil, a second induction coil coupled with the first-mentioned coil, and circuit making and breaking means connected with said second coil.

11. In a system for the transmission of intelligence, means for producing high frequency electrical oscillations, means for radiating groups of waves, each group consisting of waves having a wave frequency corresponding to the frequency of said electrical oscillations and a secondary frequency impressed upon the wave frequency, means for modifying the secondary frequency in accordance with signals, and means for interrupting the production of said secondary frequency between each of the above mentioned signal modifications.

12. In a system for the transmission of intelligence, a transmitter comprising a source of energy having the form of high frequency electrical oscillations, and means for impressing periodic amplitude variations of respectively different frequencies upon the electrical oscillations, said means comprising a tuned circuit including an inductance coil, a second inductance coil coupled with the first mentioned inductance coil, making and breaking means connected with said second coil, and making and breaking means connected with said first mentioned coil.

13. In a system for the transmission of intelligence, a transmitter comprising a source of energy having the form of high frequency electrical oscillations, and means for impressing periodic amplitude variations of respectively different frequencies upon the electrical oscillations, said means comprising a tuned circuit including an inductance coil, a second inductance coil coupled with the first mentioned coil, circuit making and breaking means connected with said first mentioned coil, and automatic circuit making and breaking means connected with said second mentioned coil, for automatically interrupting said secondary frequency.

14. In a system for the transmission of intelligence, a transmitter comprising a source of energy having a source of high frequency electrical oscillations, means for impressing periodic amplitude variations upon said electrical oscillations, means for automatically interrupting the generation of said periodic amplitude variations, and automatic signal controlling means included in said impressing means and operable only when said interrupting means is closed.

15. In a system for the transmission of intelligence, a transmitter comprising a source of energy having a form of high frequency electrical oscillations, means for impressing periodic amplitude variations of respectively different frequencies upon the electrical oscillations, said means comprising a tuned circuit including an inductance coil, a second inductance coil coupled to the first mentioned coil, keying means for making and breaking the circuit including said second mentioned coils to automatically form dots and dashes, and means operating synchronous therewith for interrupting the production of said high frequency electrical oscillations between each of said dots and dashes.

Signed at Gloucester, in the county of Essex and State of Massachusetts, this 17th day of January, 1925.

JOHN HAYS HAMMOND, Jr.